United States Patent
Michaelis et al.

(10) Patent No.: US 7,502,958 B2
(45) Date of Patent: *Mar. 10, 2009

(54) SYSTEM AND METHOD FOR PROVIDING FIRMWARE RECOVERABLE LOCKSTEP PROTECTION

(75) Inventors: Scott L. Michaelis, Plano, TX (US); Anurupa Rajkumari, Round Rock, TX (US); William B. McHardy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 626 days.

This patent is subject to a terminal disclaimer.

(21) Appl. No.: 10/973,076

(22) Filed: Oct. 25, 2004

(65) Prior Publication Data

US 2006/0107107 A1     May 18, 2006

(51) Int. Cl.
*G06F 11/00* (2006.01)

(52) U.S. Cl. .......................... 714/12; 712/31

(58) Field of Classification Search ............. 714/10–13, 714/712, 31, 34; 712/31
See application file for complete search history.

(56) References Cited

U.S. PATENT DOCUMENTS

| | | | |
|---|---|---|---|
| 4,358,823 A | 11/1982 | McDonald et al. | |
| 5,226,152 A | 7/1993 | Klug et al. | |
| 5,249,188 A | 9/1993 | McDonald | |
| 5,537,655 A | 7/1996 | Truong | |
| 5,675,794 A | 10/1997 | Meredith | |
| 5,751,932 A | 5/1998 | Horst et al. | |
| 5,758,058 A | 5/1998 | Milburn | |
| 5,764,660 A | 6/1998 | Mohat | |
| 5,896,523 A * | 4/1999 | Bissett et al. | 713/400 |
| 5,915,082 A * | 6/1999 | Marshall et al. | 714/11 |
| 5,991,900 A | 11/1999 | Garnett | |
| 6,065,135 A | 5/2000 | Marshall et al. | |
| 6,141,770 A | 10/2000 | Fuchs et al. | |
| 6,148,348 A | 11/2000 | Garnett et al. | |
| 6,220,581 B1 | 4/2001 | Mueller | |
| 6,263,452 B1 | 7/2001 | Jewett et al. | |
| 6,438,687 B2 | 8/2002 | Klein | |
| 6,473,869 B2 | 10/2002 | Bissett et al. | |
| 6,560,682 B1 | 5/2003 | Miller et al. | |
| 6,604,177 B1 | 8/2003 | Kondo et al. | |
| 6,615,366 B1 | 9/2003 | Grochowski et al. | |
| 6,625,749 B1 * | 9/2003 | Quach | 714/10 |
| 6,675,324 B2 | 1/2004 | Marisetty et al. | |
| 6,687,851 B1 | 2/2004 | Somers et al. | |
| 6,754,787 B2 | 6/2004 | Miller et al. | |
| 6,920,581 B2 * | 7/2005 | Bigbee et al. | 714/10 |

(Continued)

OTHER PUBLICATIONS

Filed concurrently herewith, entitled "System and Method for Using Information Relating to a Detected Loss of Lockstep for Determining a Responsive Action ".

(Continued)

*Primary Examiner*—Dieu-Minh Le

(57) ABSTRACT

According to at least one embodiment, a method comprises detecting loss of lockstep for a pair of processors. The method further comprises triggering, by firmware, an operating system to idle the processors, and recovering, by the firmware, lockstep between the pair of processors. After lockstep is recovered between the pair of processors, the method further comprises triggering, by the firmware, the operating system to recognize the processors as being available for receiving instructions.

25 Claims, 5 Drawing Sheets

U.S. PATENT DOCUMENTS

| | | |
|---|---|---|
| 6,948,092 B2 | 9/2005 | Kondo et al. |
| 7,003,691 B2 | 2/2006 | Safford et al. |
| 7,020,800 B2 * | 3/2006 | Fu et al. .................. 714/38 |
| 7,085,959 B2 * | 8/2006 | Safford .................. 714/11 |
| 7,134,047 B2 | 11/2006 | Quach |
| 7,155,721 B2 | 12/2006 | Safford et al. |
| 7,191,292 B2 * | 3/2007 | Chaudhry et al. ......... 711/133 |
| 7,225,355 B2 | 5/2007 | Yamazaki et al. |
| 7,237,144 B2 | 6/2007 | Safford et al. |
| 7,251,746 B2 | 7/2007 | Fox et al. |
| 2002/0144177 A1 | 10/2002 | Kondo et al. |
| 2002/0152420 A1 | 10/2002 | Chaudhry et al. |
| 2003/0051190 A1 | 3/2003 | Marisetty et al. |
| 2003/0070050 A1 | 4/2003 | Miller et al. |
| 2003/0126498 A1 | 7/2003 | Bigbee et al. |
| 2003/0135711 A1 | 7/2003 | Shoemaker et al. |
| 2003/0140281 A1 * | 7/2003 | Fu et al. .................. 714/38 |
| 2004/0006722 A1 | 1/2004 | Safford |
| 2004/0019771 A1 | 1/2004 | Quach |
| 2004/0078650 A1 | 4/2004 | Safford et al. |
| 2004/0078651 A1 | 4/2004 | Stafford et al. |
| 2004/0153857 A1 | 8/2004 | Yamazaki et al. |
| 2005/0172164 A1 * | 8/2005 | Fox et al. .................. 714/13 |
| 2005/0240806 A1 * | 10/2005 | Bruckert et al. ............ 714/6 |
| 2005/0240811 A1 | 10/2005 | Stafford et al. |
| 2005/0240829 A1 * | 10/2005 | Safford et al. ............. 714/43 |
| 2006/0085677 A1 | 4/2006 | Stafford et al. |
| 2006/0136672 A1 * | 6/2006 | Chaudhry et al. ......... 711/122 |
| 2006/0248384 A1 | 11/2006 | Stafford |
| 2006/0248684 A1 | 11/2006 | Vosbikian et al. |

OTHER PUBLICATIONS

Filed concurrently herewith, entitled "System and Method for Establishing a Spare Processor for Recovering From Loss of Lockstep in a Boot Processor".

Filed concurrently herewith, entitled "System and Method for Configuring Lockstep Mode of a Processor Module".

Filed concurrently herewith, entitled System and Method for Maintaining in a Multi-Processor System a Spare Processor That is in Lockstep for Use in Recovering From Loss of Lockstep for Another Processor.

Filed concurrently herewith, entitled "System and Method for Switching the Role of Boot Processor to a Spare Processor Responsive to Detection of Loss of Lockstep in a Boot Processor".

Filed concurrently herewith, entitled "System and Method for Reestablishing Lockstep for a Processor Module for Which Loss of Lockstep Is Detected".

Filed concurrently herewith, entitled "System and Method for System Firmware Causing an Operating System to Idle a Processor".

Filed concurrently herewith, entitled "System and Method for Reintroducing a Processor Module to an Operating System After Lockstep Recovery".

Filed concurrently herewith, entitled "System and Method For System Firmware Causing an Operating System to Idle a Processor".

Filed concurrently herewith, entitled "System and Method For Reintroducing a Processor Module to an Operating System After Lockstep Recovery".

* cited by examiner

SYSTEM AND METHOD FOR PROVIDING FIRMWARE RECOVERABLE LOCKSTEP PROTECTION

CROSS-REFERENCE TO RELATED APPLICATIONS

The present application is related to the following concurrently filed and commonly assigned U.S. patent applications: Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/973,004 titled "SYSTEM AND METHOD FOR CONFIGURING LOCKSTEP MODE OF A PROCESSOR MODULE"; Ser. No. 10/972,835 titled "SYSTEM AND METHOD FOR USING INFORMATION RELATING TO A DETECTED LOSS OF LOCKSTEP FOR DETERMINING A RESPONSIVE ACTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,888 titled "SYSTEM AND METHOD FOR SYSTEM FIRMWARE CAUSING AN OPERATING SYSTEM TO IDLE A PROCESSOR"; Ser. No. 10/973,075 titled "SYSTEM AND METHOD FOR REINTRODUCING A PROCESSOR MODULE TO AN OPERATING SYSTEM AFTER LOCKSTEP RECOVERY"; and Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means that a "trusted" piece of hardware is silently giving wrong answers. For example, the arithmetic unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same-operations and the results-are compared.(e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2"(1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to at least one embodiment, a method comprises detecting loss of lockstep for a pair of processors. The method further comprises triggering, by firmware, an operating system to idle the processors, and recovering, by the firmware, lockstep between the pair of processors. After lockstep is recovered between the pair of processors, the method further comprises triggering, by the firmware, the operating system to recognize the processors as being available for receiving instructions.

DETAILED DESCRIPTION

Figure 1:
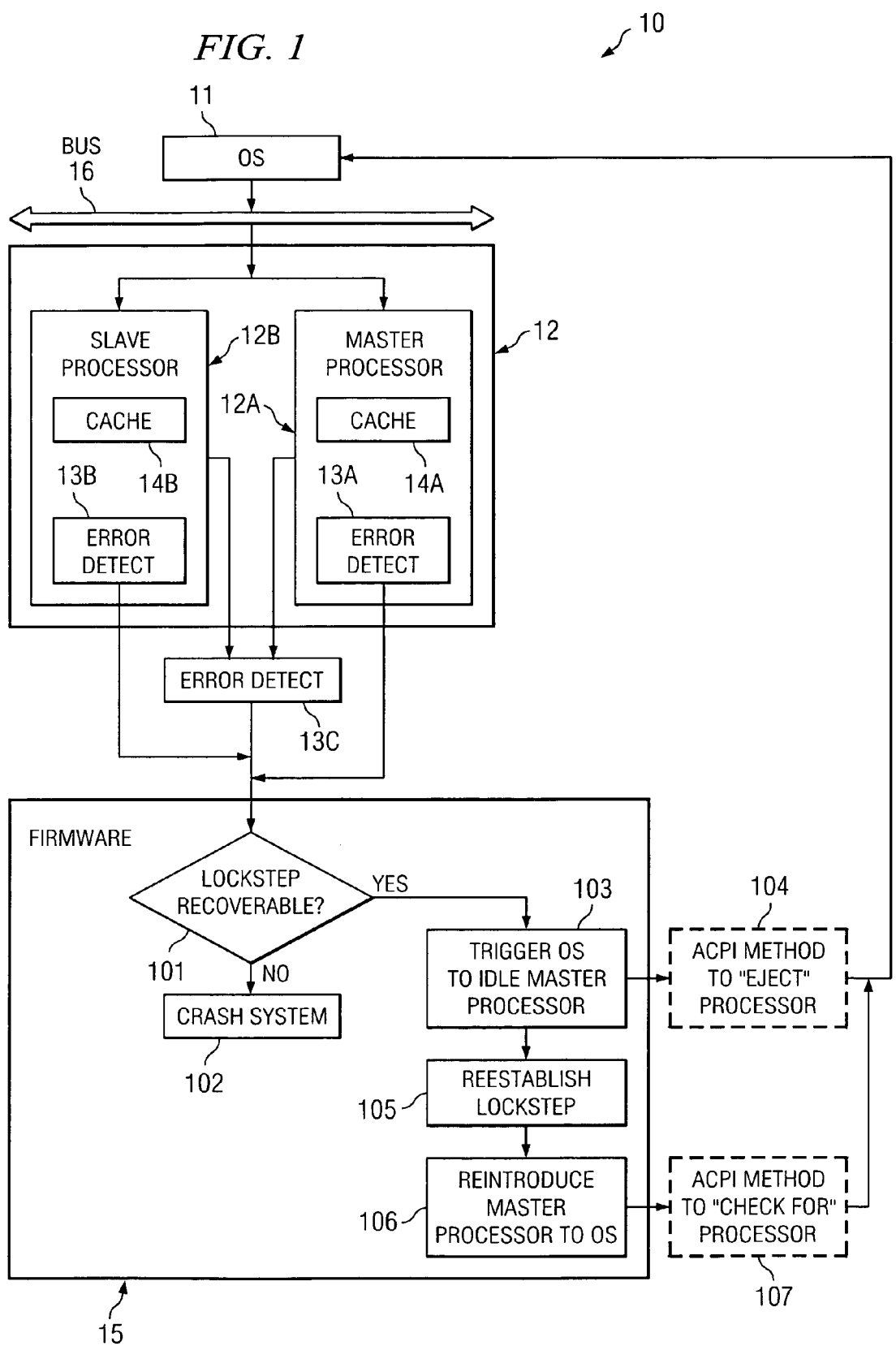
FIG. 1 shows an example embodiment of a system that uses firmware for controlling recovery from detected loss of lockstep (LOL)

Turning to FIG. 1, an example embodiment of a system 10 that uses firmware for controlling recovery from detected loss of lockstep (LOL) is shown. System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A. While only one lockstep processor pair 12 is shown for simplicity in the example of FIG. 1, system 10 may include any number of such lockstep processor pairs. As one specific example, system 10 may have 64 lockstep processor pairs, wherein the master processors of the pairs may perform parallel processing for the system.

In this example, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

Firmware 15 is also included in system 10, which in this embodiment is invoked upon an error being detected by any of the error detect logics 13A, 13B, and 13C. In certain embodiments, processors 12A and 12B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments of firmware for recovering from LOL described herein are not limited in application to an IPF architecture, but may be applied as well to other architectures (e.g., 32-bit processor architectures, etc.).

Processor architecture generally comprises corresponding supporting firmware, such as firmware 15 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported. While shown as external to the lockstep processor pair 12 in this example, in certain embodiments all or a portion of firmware 15 may be implemented on a common silicon chip with processors 12A and 12B.

In the example embodiment of FIG. 1, upon firmware 15 being invoked responsive to detection of LOL (by any of error detect logics 13A, 13B, and 13C), firmware 15 determines, in operational block 101, whether the detected LOL is a recoverable LOL. That is, firmware 15 determines in block 101 whether the detected LOL is of a type from which the firmware can recover lockstep for the lockstep processor pair 12 without crashing the system. As described further herein, lockstep is recoverable for certain detected LOLs (which may be referred to as "recoverable LOLs"), while lockstep is not recoverable for other detected LOLs (which may be referred to as "non-recoverable LOLs"). If the lockstep is not recoverable from the detected LOL, then in the example of FIG. 1 firmware 15 crashes the system in block 102.

As described further herein, firmware 15 is implemented in a manner that allows for recovery from certain detected errors without requiring that OS 11 be implemented with specific knowledge for handling such recovery. However, if the lockstep is determined to be recoverable, firmware 15 cooperates with OS 11 via standard OS methods to recover the lockstep. For instance, in the example embodiment of FIG. 1, Advanced Configuration and Power Interface (ACPI) methods are used by firmware 15 to cooperate with OS 11. Accordingly, no processor or platform specific knowledge is required to be embedded in OS 11, but instead any ACPI-compatible OS may be used, including without limitation HP-UX and Open VMS operating systems.

In the example embodiment of FIG. 1, if lockstep is determined to be recoverable in block 101, then firmware 15 triggers OS 11 to idle the master processor 12A in block 103. In this embodiment, firmware 15 utilizes an ACPI method 104 to "eject" master processor 12A, thereby triggering OS 11 to idle the master processor 12A (i.e., stop scheduling tasks for the processor). Of course, by idling master processor 12A, slave processor 12B will in turn be idled. Thus, idling master processor 12A results in idling the lockstep processor pair 12. In this example embodiment, OS 11 is not aware of the presence of slave processor 12B, but is instead aware of master processor 12A. The interface of lockstep processor pair 12 to bus 16 manages copying to slave processor 12B the instructions that are directed by OS 11 to master processor 12A. Thus, firmware 15 need not direct OS 11 to eject slave processor 12B, as OS 11 is not aware of such slave processor 12B in this example implementation. Again, by idling master processor 12A, slave processor 12B is also idled as it merely receives copies of the instructions directed to master processor 12A. Of course, if in a given implementation OS 11 is aware of slave 12B, firmware 15 may be implemented to also direct OS 11 to idle such slave processor 12B in a manner similar to that described for idling master processor 12A. An example technique that may be utilized by firmware 15 for triggering OS 11 to idle master processor 12A in accordance with certain embodiments is described further in concurrently filed and commonly assigned U.S. patent application Ser. No. 10/972,888 titled "SYSTEM AND METHOD FOR SYSTEM FIRMWARE CAUSING AN OPERATING SYSTEM TO IDLE A PROCESSOR", the disclosure of which is hereby incorporated herein by reference.

Firmware 15 then attempts to recover lockstep for the lockstep processor pair 12 in block 105. For instance, firmware 15 resets the processor pair 12. During such reset of processor pair 12, system 10 can continue to operate on its remaining available processors (not shown in FIG. 1). An example technique that may be utilized by firmware 15 for recovering lockstep in accordance with certain embodiments is described further in concurrently filed and commonly assigned U.S. patent application Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosure of which is hereby incorporated herein by reference.

Once the processor pair 12 is reset and lockstep is recovered, firmware 15 reintroduces master processor 12A to OS 11 in operational block 106. In this embodiment, firmware 15 updates the ACPI device table information for master processor 12A to indicate that such master processor 12A is "present, functioning and enabled." As discussed in the ACPI 2.0 specification for the _STA status method of a device, the _STA (status) object returns the status of a device, which can be one of the following: enabled, disabled, or removed. In this respect, in the result code (bitmap) bit 0 is set if the device is present; bit 1 is set if the device is enabled and decoding its resources; bit 2 is set if the device should be shown in the UI; bit 3 is set if the device is functioning properly (cleared if the device failed its diagnostics); bit 4 is set if the battery is present; and bits 531 are reserved. A device can only decode its hardware resources if both bits 0 and 1 are set. If the device is not present (bit 0 cleared) or not enabled (bit 1 cleared), then the device must not decode its resources. Bits 0, 1 and 3 are the "present, enabled and functioning" bits mentioned above. Firmware 15 utilizes an ACPI method 107 to trigger OS 11 to "check for"master processor 12A, thereby reintroducing the master processor 12A to OS 11. As a result of checking for master processor 12A, OS 11 will recognize that such master processor 12A is again available and will thus begin scheduling tasks for master processor 12A once again. An example technique that may be utilized by firmware 15 for reintroducing a processor to the OS after recovery of lockstep in accordance with certain embodiments is described further in concurrently filed and commonly assigned U.S. patent application Ser. No. 10/973,075 titled "SYSTEM AND METHOD FOR REINTRODUCING A PROCESSOR MODULE TO AN OPERATING SYSTEM AFTER LOCKSTEP RECOVERY", the disclosure of which is hereby incorporated herein by reference.

Figure 2:
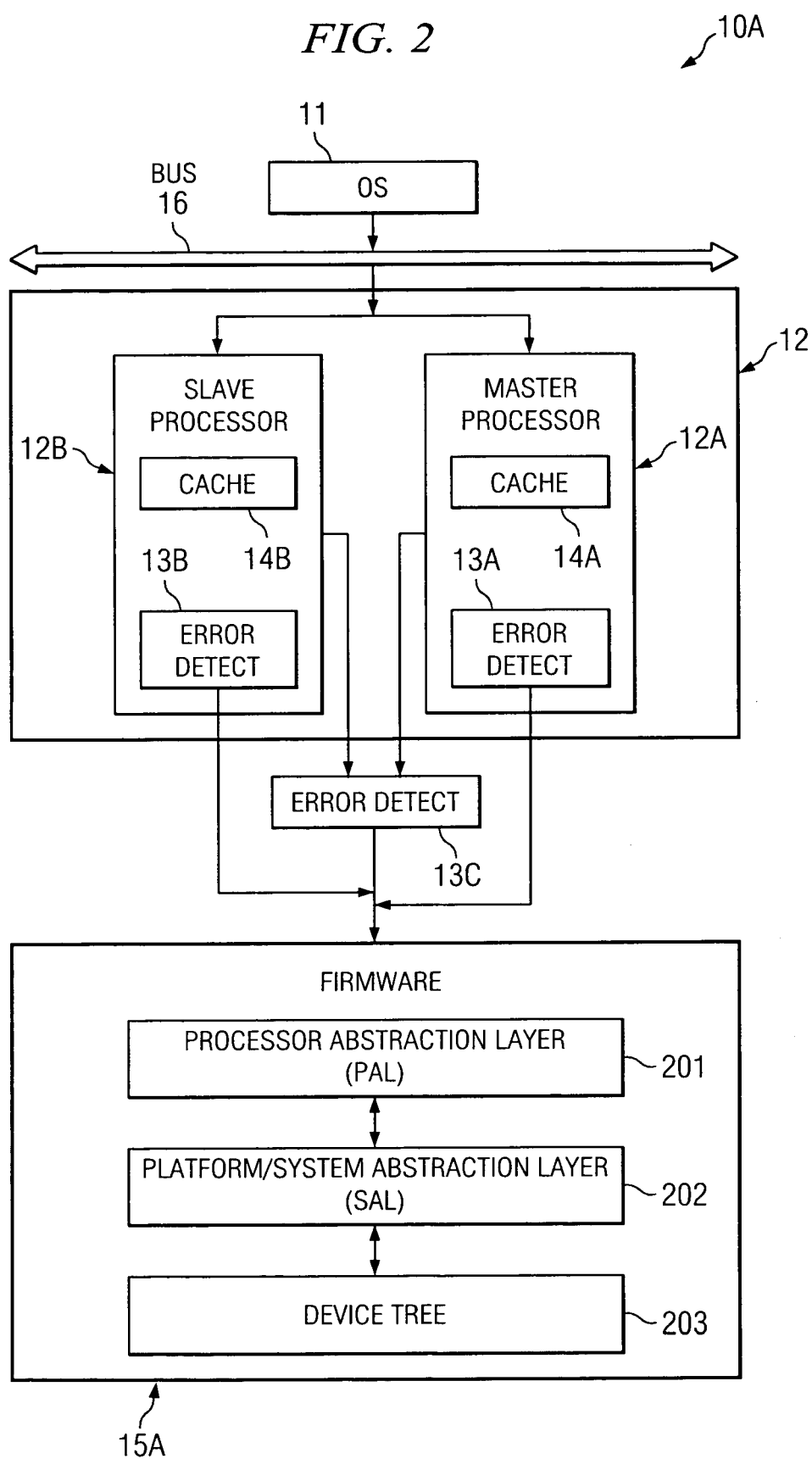
FIG. 2 shows a block diagram of one embodiment implemented for the IA-64 processor architecture.

FIG. 2 shows a block diagram of one embodiment of the above system 10, which is implemented for the IPF processor architecture and is labeled as system 10$_A$. The quintessential model of the traditional IPF architecture is given in the *Intel IA-64 Architecture Software Developer's Manual, Volume 2: IA-64 System Architecture*, in section 11.1 *Firmware Model*, the disclosure of which is hereby incorporated herein by reference. Accordingly, in this example embodiment of system 10$_A$, firmware 15, labeled as firmware 15$_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system 10$_A$ (recall that there may be many lockstep processor pairs 12) such that the processors begin executing concurrently through the same firmware.

After it has performed its duty of initializing the processor(s), PAL 201 passes control of system 10$_A$ to SAL 202. It is the responsibility of SAL 202 to discover what hardware is present on the system platform, and initialize it to make it available for the OS 11. When main memory is initialized and functional, the firmware 15$_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system 10$_A$ by branching the boot processor into the entry point of such OS loader program.

The OS loader program then uses the standard firmware interfaces to discover and initialize system 10$_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware 15$_A$ is no longer in control of system 10$_A$.

As OS 11 is initializing, it has to discover from the firmware 15$_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware 15$_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 15A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The _STA method described above is an example of such an ACPI method. When _STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls _STA for that device, the "lockstep lost" property directs the AML code to return to "0" in the "functioning properly" bit so that OS 11 can know there is a problem with that processor.

If a lost lockstep is recovered in accordance with the recovery technique described herein, firmware 15A can indicate that lockstep has been recovered in the device tree 203. Then when _STA is called on that device responsive to the OS receiving the "check for device" ACPI method, the present, enabled and functioning bits will all be set and OS 11 will know the CPU is safe to use. A simple example of device tree 203 is shown below in Table 1:

TABLE 1

| Device | Status | Lockstep Enabled |
|---|---|---|
| Processor A | Present, Enabled, and Functioning | Yes |

Example interactions between the PAL 201, SAL 202, and device tree 203 for responding to a detected LOL (e.g., determining it is recoverable and if so then recovering from such LOL) for an IPF system in accordance with certain embodiments are described further herein (e.g., in conjunction with FIG. 5 below), as well as in the co-pending U.S. patent applications incorporated by reference herein.

Figure 3:
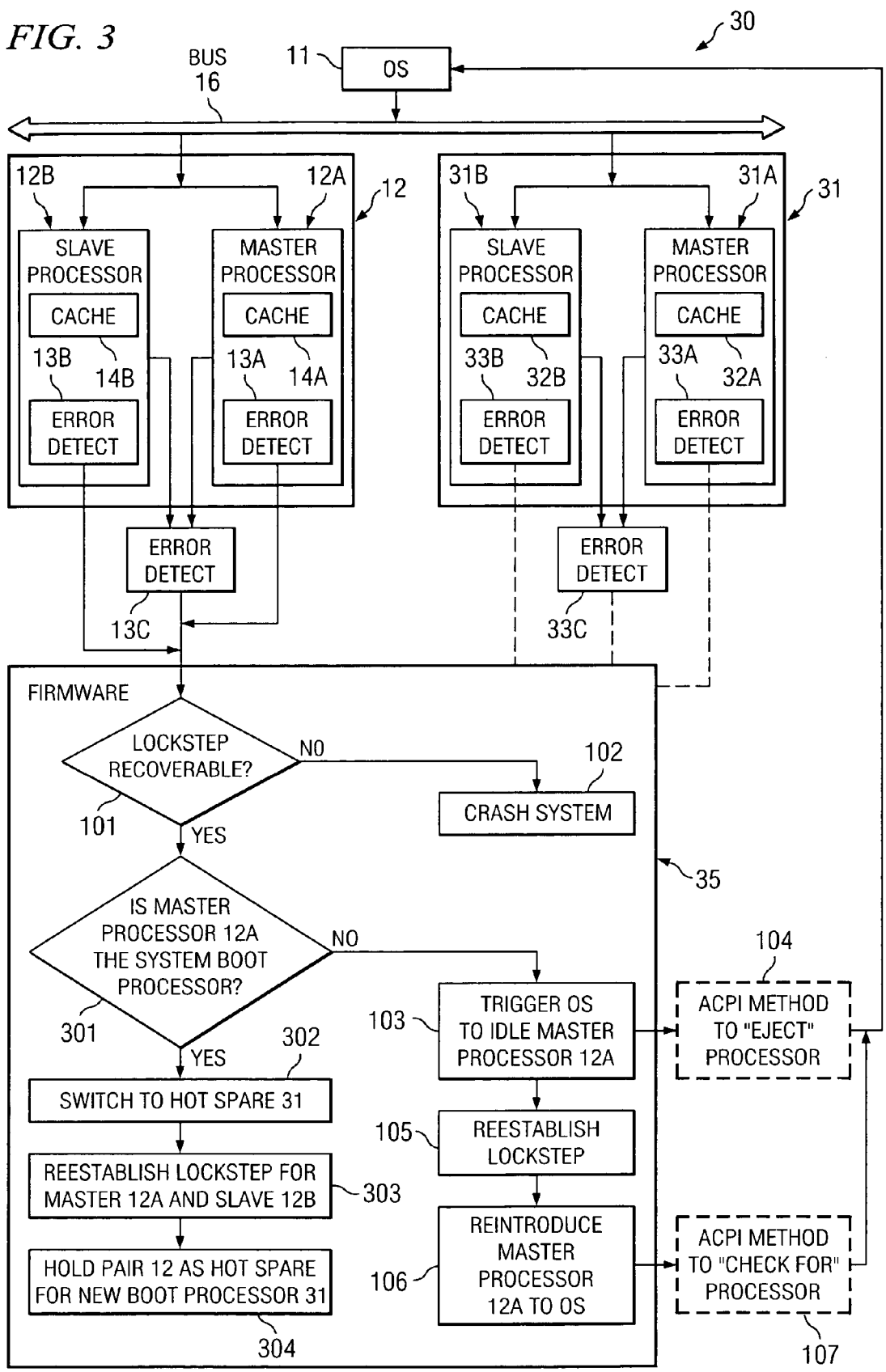
FIG. 3 shows an example system in which firmware utilizes a hot spare processor for recovering from LOL for the system's boot processor.

In certain embodiments, a different recovery technique is employed when LOL is detected for the system's boot processor than is employed for other processors of the system. For various reasons, in certain system architectures problems arise in attempting to idle (or eject) the boot processor from the system. Thus, in certain embodiments, a hot spare processor is used for recovering from LOL for the system's boot processor. More specifically, upon LOL being detected for a boot processor, a hot spare processor (i.e., an idling processor that is available in the system) is transferred the role of boot processor, and then the old boot processor having LOL is reset to reestablish its lockstep. Turning to FIG. 3, an example system 30 is shown in which firmware utilizes this hot spare technique for recovering from LOL for a boot processor. As with system 10 of FIG. 1, system 30 includes OS 11, bus 16, and lockstep processor pair 12 with its error detect logic 13A-13C. System 30 further includes a second lockstep processor pair 31 that is communicatively coupled to bus 16. Lockstep processor pair 31 includes master processor 31A and slave processor 31B. Master processor 31A includes cache 32A, and slave processor 31B includes cache 32B. As with error detect logic 13A-13C implemented for lockstep processor pair 12, lockstep processor pair 31 has error detect logic 33A-33 C.

Suppose that during the system boot-up procedure, master processor 12A assumes the role of boot processor. In this example embodiment, lockstep processor pair 31 may be held as a hot spare for recovering from a LOL that may be detected for the boot processor 12A. Of course, additional lockstep processor pairs may be included in system 30 (not specifically shown in the example of FIG. 3), and those additional lockstep processor pairs, which are not the system boot processor, may recover from LOL in the manner described above with FIG. 1. Thus, hot spare processor pair 31 is not needed for recovering from LOL detected for any non-boot processor, but may instead be used only for recovery of LOL for the boot processor (processor 12A in this example).

Firmware 35 is included in this example, and upon detection of LOL by any of error detect logics 13A-13C, it determines whether the lockstep is recoverable in block 101 (as described with FIG. 1 above). If not, firmware 35 crashes the system in block 102 in this example embodiment. If the lockstep is recoverable, then operation advances to block 301 whereat the firmware determines whether the processor for which the LOL was detected is the system's boot processor. Because the LOL is detected for the lockstep processor pair 12 in this example, firmware 35 determines whether master processor 12A is the system's boot processor. This can be determined, for example, by accessing the device tree 203 of FIG. 2, as such device tree includes a field for each processor indicating whether such processor is the system's boot processor. This field in the device tree may be set by the firmware during the boot-up process to identify the corresponding processor that is used as the system's boot processor. If determined in block 301 that the master processor 12A is not the system's boot processor, then operation advances to block 103, and the lockstep recovery process proceeds in the manner described above with FIG. 1.

However, if determined in block 301 that the master processor 12A is the system's boot processor, operation advances to block 302 whereat the state of the "good" processor in the lockstep processor pair 12 is copied over to each of processors 31A and 31B in the spare lockstep processor pair 31. Example techniques that may be utilized by firmware 35 for switching the state of a "good" processor in the lockstep processor pair 12 in accordance with certain embodiments is described further in copending U.S. patent application Ser. No. 10/187,833 (published as publication No. US 2004/0006722 A1) filed Jul. 3, 2002 and titled "METHOD AND APPARATUS FOR RECOVERY FROM LOSS OF LOCK STEP" and in concurrently filed and commonly assigned U.S. patent application Ser. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR", the disclosures of which are each hereby incorporated herein by reference.

Thus, operational block 302 essentially makes the spare processor pair 31 the system's boot processor, and then in block 303 firmware 35 resets the lockstep processor pair 12 and reestablishes its lockstep. Once lockstep is reestablished for lockstep processor pair 12, that pair is held in operational block 304 as a hot spare for the new boot processor pair 31. That is, firmware 35 updates the device tree 203 of FIG. 2 to reflect that lockstep processor pair 12 is a hot spare for the boot processor pair 31. Thus, should a recoverable LOL be detected for the new boot processor 31, the above process may be used by firmware 35 to make the spare lockstep processor pair 12 the boot processor and then recover lockstep for pair 31. An example technique for resetting the lockstep processor pair 12 and reestablishing its lockstep in which the lockstep processor pair 12 is then held as a hot spare is described further in concurrently filed and commonly assigned U.S. patent application Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosure of which is hereby incorporated herein by reference.

Figure 4:
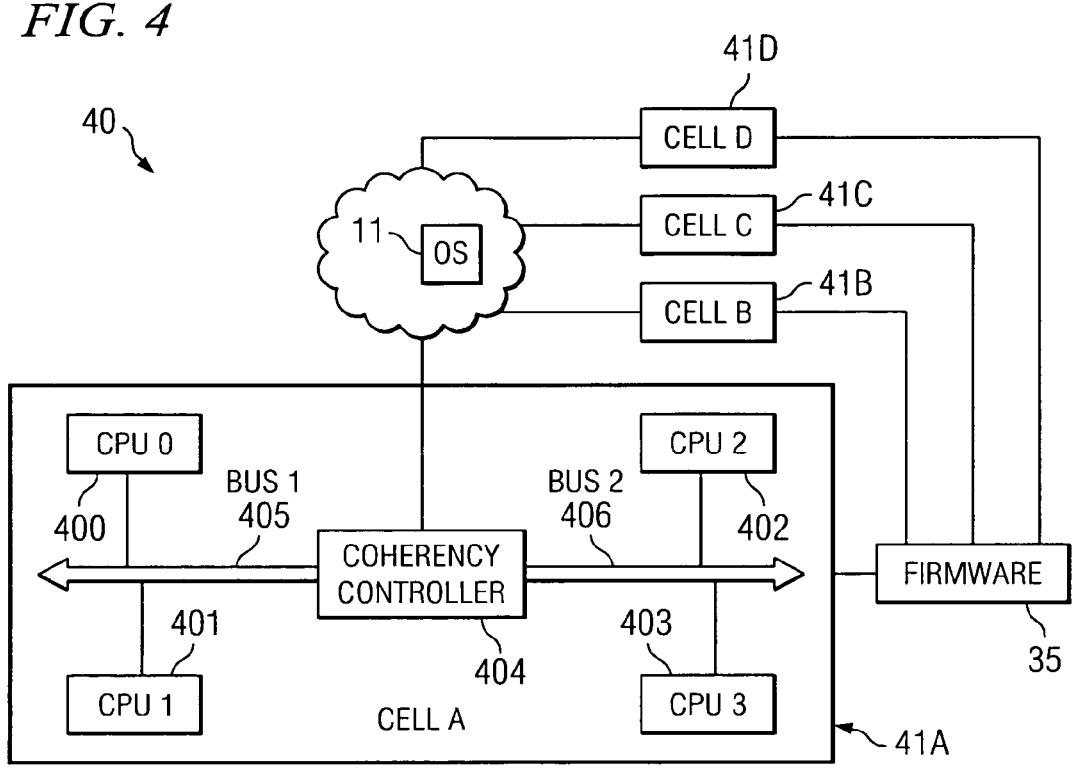
FIG. 4 shows an example system having multi-processor cells in which an embodiment for using firmware for recovering from LOL may be employed.

One example system in which firmware 35 of FIG. 3 may be employed is shown in FIG. 4. FIG. 4 shows system 40 that includes multi-processor cells A-D, labeled $41_A$-$41_D$, respectively. Cell A $41_A$ is shown in more detail, and should be understood that cells B-D $41_B$-$41_D$ have substantially the same architecture as that of cell A $41_A$ in this example. The architecture of cell A $41_A$ described hereafter corresponds to that of Hewlett-Packard's Superdome™ systems. As shown, multi-processor cell A $41_A$ includes coherency controller 404 that is communicatively coupled to two buses, labeled 405 and 406, respectively. A plurality of processors are included within cell A $41_A$, shown as CPU 0, CPU 1, CPU 2 and CPU 3 (and labeled 400-403, respectively). More particularly, a plurality of processors are communicatively coupled to each of the buses 405 and 406. In this example, CPU 0 (400) and CPU 1 (401) are each communicatively coupled to the first bus 405, and CPU 2 (402) and CPU 3 (403) are each communicatively coupled to the second bus 406. It should be understood that each of CPU 0 (400), CPU 1 (401), CPU 2 (402), and CPU 3 (403) may in actuality be a lockstep processor pair, such as the lockstep processor pair 12 of FIGS. 1-3. Thus, for instance, CPU 0 (400) includes both a master processor and a slave processor, as with processors 12A and 12B included in the lockstep processor pair 12 of FIGS. 1-3.

Coherency controller 404 decodes the address an interrupt is targeted towards and determines which bus (405 or 406) the interrupt packet should be delivered to. Each CPU on the destination bus sees the interrupt and compares the interrupt target address with its internal "LID" register to determine if it is the targeted CPU. If the match is correct, the CPU responds to the interrupt. If the match is not correct, the CPU ignores the interrupt packet.

As shown, the example firmware 35 described above with FIG. 3 may be employed to manage the recovery from detected LOLs for the processors of cells A-D ($41_A$-$41_D$). In this example architecture, when designating a hot spare for the boot processor, such hot spare is selected to be another processor communicatively coupled to the same bus as the boot processor. For instance, suppose that during the boot-up of system 40, CPU 2 (402) is designated as the boot processor. Accordingly, firmware 35 will identify another processor that is communicatively coupled to bus 406 to designate as a hot spare for such boot processor, such as CPU 3 (403). During runtime if a LOL is detected for CPU 2 (402), then firmware 35 operates according to the process described above in FIG. 3 to switch the designation of boot processor to the hot spare, CPU 3 (403). In performing this switch the LID register of the CPU that lost lockstep is copied into the LID register of the Hot-Spare CPU and the Hot-Spare CPU pair will then assume the ID of the failed CPU and start responding to interrupts directed to that ID. The LID of the failed CPU is quickly re-written to a different value so that it will no longer respond to interrupts directed to that ID. CPU 2 (402) can then be reset to recover its lockstep, and such CPU 2 (402) may then be held as a hot spare for the new boot processor CPU 3 (403).

It should be recognized that in the example system of FIG. 4, if a hot spare were used for recovering from LOL for all processors, rather than just for the boot processor, much of the potential processing resources would be required to be held as spare resources. For instance, a hot spare would be required on each of the buses of each cell. Because there are two processors coupled to each bus in this example (i.e., CPU 0 and CPU 1 coupled to bus 405, and CPU 2 and CPU 3 coupled to bus 406), reserving a hot spare processor for each bus would result in holding half of the total processing resources in spare. This is an undesirably expensive and wasteful solution. Thus, according to the illustrated embodiment, only a hot spare processor is reserved for the boot processor. Thus, continuing with the above example in which CPU 2 is the boot processor and CPU 3 is held in idle as a hot spare, both of CPU 0 and CPU 1 are active (i.e., neither are held in spare). Further, none of the processors of cells B-D need to be held as hot spares. In the event of a recoverable LOL occurring for any of non-boot processors of the cells, the lockstep recovery process of FIG. 1 (i.e., operational blocks 103-106) can be utilized without requiring a hot spare for lockstep recovery for those non-boot processors.

While in the above example embodiment, a hot spare CPU is maintained for recovery from LOL for the system's boot processor, in an alternative embodiment a hot spare need not be held as such, but rather a processor can be dynamically made a "spare" when needed for recovery from LOL encountered for the system boot processor. That is, assuming as in the above example of FIG. 4 that CPU 2 is the system's boot processor, CPU 3 does not have to be held as a hot spare for CPU 2, but instead CPU 3 can be idled and made a "spare" upon detection of LOL in CPU 2. Thus, the resource of this spare CPU need not be wasted during normal runtime, but can be dynamically turned into a spare processor that is available for recovering from LOL encountered on CPU 2 in the manner described above. As an example of this embodiment, the firmware may send an "eject request" on a healthy processor pair (e.g., CPU 3), and lie to the OS by indicating (e.g., in response to an ACPI_STA method for the healthy processor pair) that such processor pair is not functioning. This would cause the OS to eject that processor pair as though it had encountered a LOL. This processor would become the "hot spare" and be used to replace the boot processor. The system boot processor role would be assumed by the idled healthy processor pair, just as described above in the example of FIG. 4 in which the healthy CPU 3 is held idle for the system boot processor, CPU 2. The only difference being that now the firmware had to take some initial action to turn the healthy processor pair into a "hot spare" by idling it and making it appear to the OS as though it was not functioning. Thus, the LIDs would be swapped. That is, the LID register of the boot processor that lost lockstep is copied into the LID register of the now spare processor pair (CPU 3 in this example), and the LID register of this spare processor pair would be copied into the LID register of the original boot processor. Lockstep is then reestablished on the original boot processor, and it can be reintroduced to the OS with the ID of the original non-boot processor that replaced it as the system boot processor.

Figure 5:
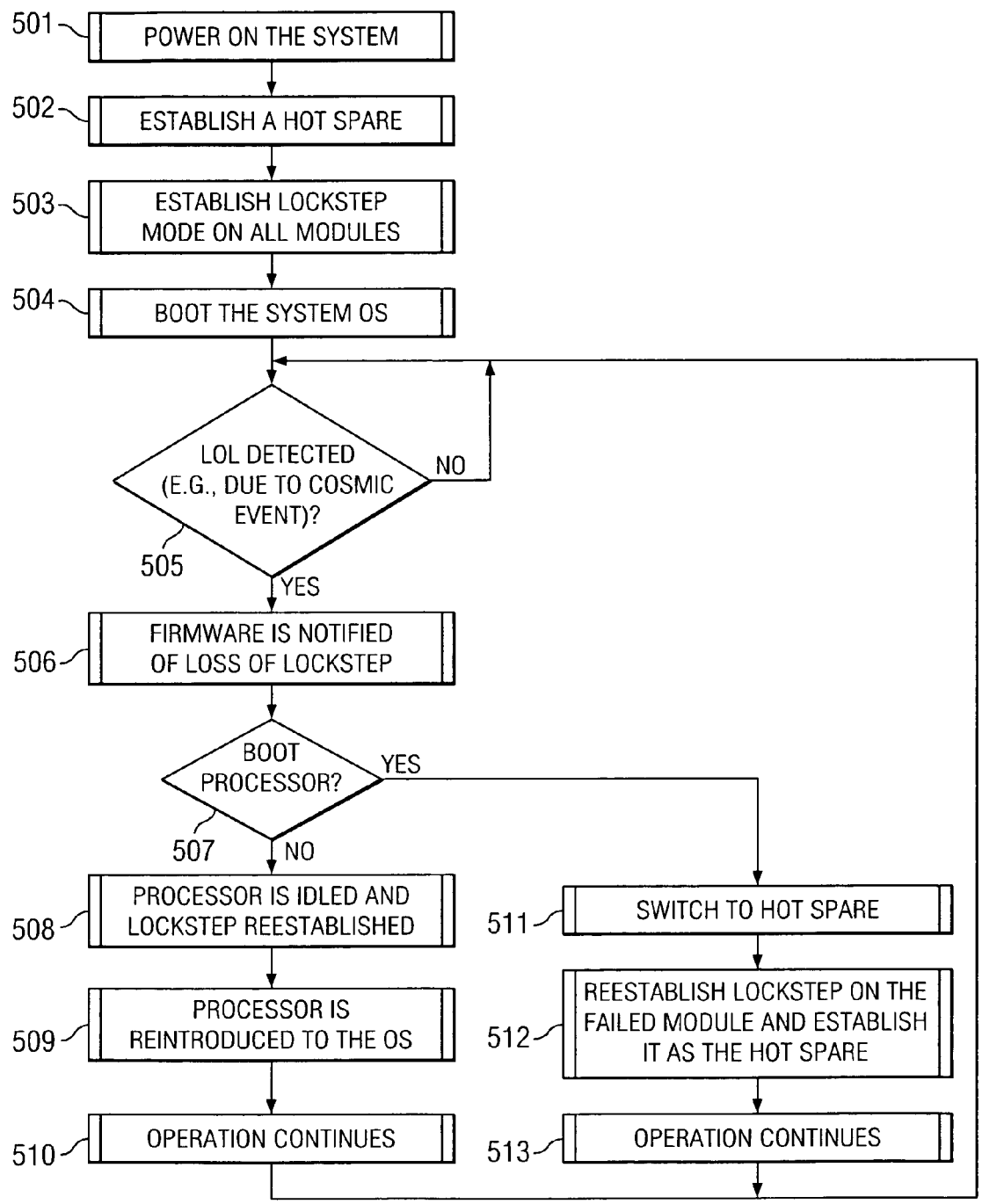
FIG. 5 shows a detailed operational flow diagram for one embodiment.

Turning now to FIG. 5, an operational flow diagram for one embodiment is shown. In operational block 501, the system is powered on. In operational block 502, the system's firmware establishes a hot spare for the system's boot processor. For instance, in the example system 40 of FIG. 4, if CPU 2 (402) is designated as the boot processor, the firmware 35 identifies a processor on the same bus as the boot processor, such as CPU 3 (403), as a hot spare, and firmware 35 updates the device tree to designate that such CPU 3 (403) is a hot spare for the boot processor CPU 2 (402). An example technique that may be utilized by firmware 35 for establishing a hot spare for the boot processor in accordance with certain embodiments is described further in concurrently filed and commonly assigned U.S. patent application Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR", the disclosure of which is hereby incorporated herein by reference.

In operational block 503, the firmware establishes lockstep mode on the appropriate processor modules (or lockstep processor pairs). As described further in concurrently filed and commonly assigned U.S. patent application Ser. No. 10/973,004 titled "SYSTEM AND METHOD FOR CONFIGURING LOCKSTEP MODE OF A PROCESSOR MODULE", the disclosure of which is hereby incorporated herein by reference, in certain embodiments whether lockstep is activated for the system (or for any given partition of a system) is configurable by a system administrator. Thus, rather than the processors of a system being fixed in either lockstep mode or not in lockstep mode, certain embodiments permit lockstep mode to be activated and deactivated for a system as may be desired by a system administrator. In the event that lockstep mode is not activated for the system, then the processors that would have been used as slave processors in lockstep mode are available to be used as "master" processors for processing instructions, thus increasing the total amount of computing resources available to the OS. If for example, having a greater number of processors available for computing separate instructions is more desirable than guarding fully against SDC on a given partition of a customer's system, then lockstep processing may be disabled for such partition, and lockstep processing may be enabled for those partitions in which fully guarding against SDC is of more importance.

In operational block 504, the boot process boots the system OS and completes with the firmware passing control of the system over to the OS. During system runtime, if the system is operating in lockstep mode, then error detect logic present in the system (such as error detect logic 13A-13C of FIG. 1) monitors for LOL. Thus, block 505 represents the continuous monitoring by the error detect logic of their respective processors for LOL. If an LOL is detected by the error logic, then the firmware is notified of the detected LOL in block 506. An example technique that may be utilized for notifying the firmware of the detected LOL in accordance with certain embodiments is described further in concurrently filed and commonly assigned U.S. patent application Ser. No. 10/972,835 titled "SYSTEM AND METHOD FOR USING INFORMATION RELATING TO A DETECTED LOSS OF LOCKSTEP FOR DETERMINING A RESPONSIVE ACTION", the disclosure of which is hereby incorporated herein by reference. As mentioned above, the firmware determines whether the detected LOL is recoverable. If determined that the LOL is recoverable, then operation continues in the firmware for recovering the LOL in the manner described hereafter.

In block 507, the firmware determines whether the processor for which the LOL is detected is the system's boot processor. This determination may be made by searching for the processor for which the LOL is detected in the device tree (e.g., tree 203 of FIG. 2) and evaluating the fields associated with such processor in the device tree to determine whether the device tree identifies such processor as the boot processor.

If the processor for which LOL is detected is not the system boot processor, then operation advances to block 508 whereat the processor for which the LOL is detected is idled, and actions are taken to reestablish its lockstep. As described above, an ACPI "eject" method may be used to instruct the system's OS to idle the processor, such as described more fully in concurrently filed and commonly assigned U.S. patent application Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED", the disclosure of which is hereby incorporated herein by reference. In order to reestablish lockstep, the processor may be reset. At the end of this step, the processor is executing in firmware space and lockstep has been reestablished for the processor.

The processor is then ready to be introduced back to the OS. Thus, in block 509, the firmware reintroduces to the OS the processor having its lockstep recovered. An example technique that may be utilized for reintroducing the processor back to the OS in block 509 in accordance with certain embodiments is described further in concurrently filed and commonly assigned U.S. patent application Ser. No. 10/973,075 titled "SYSTEM AND METHOD FOR REINTRODUCING A PROCESSOR MODULE TO AN OPERATING SYSTEM AFTER LOCKSTEP RECOVERY", the disclosure of which is hereby incorporated herein by reference. Operation then continues in block 510, wherein the processor whose lockstep was recovered is available to run tasks as scheduled by the OS and the system's processors are monitored for another LOL in block 505. That is, in block 510 the system is back to a stable state with full lockstep protection again being provided.

Unfortunately, as mentioned above, in certain systems the system boot processor that initialized the OS during the systems bootup process cannot easily be idled and returned to firmware control. Thus, a different technique than that described above for nonboot processors is employed in this embodiment. Accordingly, if determined in block 507 that the LOL is detected for the system's boot processor, operation advances to block 511 whereat the state of the "good" boot processor is copied to the hot spare that was established for the boot processor in block 502. As mentioned above, example techniques that may be utilized by the firmware for switching the state of a "good" processor in the lockstep processor pair that is the system boot processor in accordance with certain embodiments is described further in copending U.S. patent application Ser. No. 10/187,833 (published with publication no. US 2004/0006722 A1) filed Jul. 3, 2002 and titled "METHOD AND APPARATUS FOR RECOVERY FROM LOSS OF LOCK STEP" and in concurrently filed and commonly assigned U.S. patent application Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR", the disclosures of which are each hereby incorporated herein by reference.

In operational block 512, the firmware reestablishes lockstep on the processor for which the LOL was detected (e.g., by resetting the processor), and the firmware establishes the processor having recovered lockstep as the hot spare for the new boot processor. Such processor whose lockstep has been recovered may be established as a spare for the new boot processor in the manner described above in block 502, and as discussed further in concurrently filed and commonly assigned U.S. patent application Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR", the disclosure of which is hereby incorporated herein by reference. Operation of the system continues in block 513 wherein the processors are monitored for another LOL in block 505. In block 513 the system is back to a stable state with full lockstep protection again being provided.

In certain embodiments, if the lockstep cannot be recovered in operational block 508 (e.g., the processor fails its self-test when being reset), then that processor is simply not reintroduced back to the OS in block 509. A message can be generated for the system administrator to provide notice of the loss of this processor, and if desired the system administrator can schedule an orderly shutdown and service of the system (e.g., for replacing the processor). Similarly, if the lockstep cannot be recovered in operational block 512 (e.g., the processor fails its self-test when being reset), then a message can be generated for the system administrator to provide notice of the loss of this processor (as thus loss of lockstep recovery protection for the boot processor). In other words, if the lockstep cannot be reestablished in block 512, then if a LOL occurs in the new boot processor there will not be a spare processor for taking over its role (and thus the system may crash). If desired, the system administrator can schedule an orderly shutdown and re-boot in order to establish a new boot processor that has a hot spare available and/or schedule service of the system (e.g., for replacing the failed processor).

Figure 6:
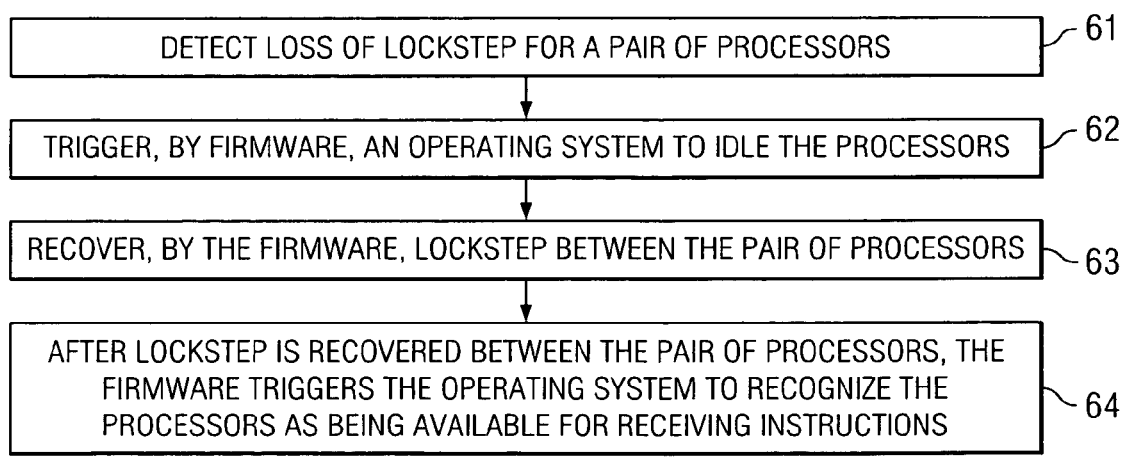
FIG. 6 shows a more general operational flow diagram for certain embodiments.

While a detailed flow diagram of one embodiment is shown in FIG. 5, embodiments hereof are not limited to that example operational flow. For instance, a more general operational flow according to one embodiment is shown in FIG. 6. In FIG. 6, LOL for a pair of processors is detected in operational block 61. In block 62, firmware triggers an OS to idle the processors for which the LOL was detected. In block 63, the firmware recovers lockstep between the pair of processors. In block 64, after lockstep is recovered between the pair of processors, the firmware triggers the OS to recognize the processors as again being available for receiving instructions. As described above, the above technique may be modified for recovering from LOL for the boot processor in certain systems.

What is claimed is:

1. A method comprising:
   detecting loss of lockstep for a lockstep pair of processors;
   using firmware to trigger an operating system to idle the lockstep pair of processors, recover lockstep for the lockstep pair of processors, and trigger the operating system to recognize the lockstep pair of processors having recovered lockstep; and
   responsive to said detecting loss of lockstep, using said firmware to determine if lockstep is recoverable for the lockstep pair of processors, wherein said using said firmware to determine if lockstep is recoverable further comprises determining if a lockstep mismatch has occurred between the lockstep pair of processors.

2. The method of claim 1 wherein said using firmware to trigger an operating system to idle the lockstep pair of processors further comprises:
   using the firmware to trigger the operating system to idle a master processor of the lockstep pair of processors.

3. The method of claim 2 wherein said using firmware to trigger the operating system to recognize the lockstep pair of processors having recovered lockstep further comprises:
   using the firmware to trigger the operating system to recognize the master of the lockstep pair of processors.

4. The method of claim 1 wherein said detecting loss of lockstep comprises:
   detecting corrupt data in one of said lockstep pair of processors that would lead to a lockstep mismatch if acted upon.

5. The method of claim 1 wherein said detecting loss of lockstep comprises:
   detecting a precursor to lockstep mismatch.

6. The method of claim 1 wherein said detecting loss of lockstep comprises:
   detecting lockstep mismatch between the lockstep pair of processors.

7. The method of claim 1 further comprising:
   if determined that a lockstep mismatch has not occurred between the lockstep pair of processors, then determining that the loss of lockstep is recoverable.

8. The method of claim 1 further comprising:
   if determined that a lockstep mismatch has occurred between the lockstep pair of processors, then determining that the loss of lockstep is not recoverable.

9. The method of claim 1 further comprising:
   determining if said lockstep pair of processors for which said loss of lockstep is detected comprises a system boot processor.

10. The method of claim 9 wherein if determined that said lockstep pair of processors for which said loss of lockstep is detected comprises a system boot processor, further comprising:
    swapping the role of system boot processor to another processor in the system.

11. The method of claim 10 further comprising:
    after said swapping, recovering the lockstep for the lockstep pair of processors.

12. The method of claim 11 further comprising:
    after recovering lockstep for the lockstep pair of processors, holding the recovered pair of processors in idle as a spare for the processor to which the role of system boot processor was swapped.

13. A system comprising:
    an Advanced Configuration and Power Interface (ACPI)-compatible operating system;
    master processor operable to process instructions scheduled by said ACPI-compatible operating system;
    slave processor lockstepped with the master processor operable to perform redundant processing of said instructions scheduled for the master processor; and
    firmware operable, responsive to detection of loss of lockstep between the master and slave processors, to use an ACPI method to trigger the operating system to idle the master processor, attempt to recover lockstep between the master and slave processors, and if recovery of lockstep is successful then use an ACPI method to reintroduce the master processor to the operating system.

14. The system of claim 13 further comprising:
    error detection logic for detecting loss of lockstep between the master and slave processors.

15. The system of claim 13 further comprising:
    error detection logic for detecting a precursor to loss of lockstep.

16. The system of claim 15 wherein said precursor to loss of lockstep is treated as said detection of loss of lockstep.

17. The system of claim 15 wherein said error detection logic comprises a parity-based mechanism.

18. The system of claim 13 further comprising error detection logic for detecting lockstep mismatch between the master and slave processors.

19. A system comprising a pair of lockstep processors and computer-executable firmware code stored to a computer-readable medium, the computer-executable firmware code comprising:
    firmware code, responsive to detection of loss of lockstep between the pair of lockstep processors, for determining if the lockstep is recoverable for the pair of lockstep processors, wherein said firmware code for determining if the lockstep is recoverable further comprises firmware code for determining if a lockstep mismatch has occurred between the pair of lockstep processors; and
    firmware code, responsive to determining that the lockstep is recoverable, for triggering an operating system to idle the processors, attempting to recover lockstep between the pair of processors, and if lockstep is successfully recovered between the pair of processors, triggering said operating system to recognize the processors as being available for receiving instructions.

20. The system of claim 19 wherein the code for attempting to recover lockstep further comprises:
    code for resetting the pair of processors.

21. The system of claim 19 wherein said operating system is an Advanced Configuration and Power Interface (ACPI)-compatible operating system, said code for triggering the operating system to idle the processors comprises:
    code for using an ACPI method to idle the processors.

22. The system of claim 19 wherein said operating system is an Advanced Configuration and Power Interface (ACPI)-compatible operating system, said code for triggering said operating system to recognize the processors as being available for receiving instructions comprises:
    code for using an ACPI method to cause the operating system to check for the processors.

23. A method comprising:
    establishing, in a multi-processor system, a hot spare processor for a system boot processor;
    detecting loss of lockstep for a lockstep pair of processors in said multi-processor system;

determining if said lockstep pair of processors for which the loss of lockstep is detected is the system boot processor;

if determined that said lockstep pair of processors for which the loss of lockstep is the system boot processor, copying a state of the system boot processor to the hot spare processor; and if determined that said lockstep pair of processors for which the loss of lockstep is not the system boot processor, then triggering an operating system to a) idle the lockstep pair of processors, b) attempt to recover lockstep between the lockstep pair of processors, and c) if lockstep is successfully recovered between the lockstep pair of processors, trigger said operating system to recognize the processors as being available for receiving instructions.

24. The method of claim 23 wherein if determined that said lockstep pair of processors for which the loss of lockstep is the system boot processor further comprising:

attempting to recover lockstep between the lockstep pair of processors after copying the state of the system boot processor to the hot spare processor.

25. The method of claim 24 wherein if determined that said lockstep pair of processors for which the loss of lockstep is the system boot processor further comprising:

if lockstep is successfully recovered between the lockstep pair of processors, establishing the lockstep pair of processors for which lockstep was recovered as a hot spare processor.

* * * * *

UNITED STATES PATENT AND TRADEMARK OFFICE
CERTIFICATE OF CORRECTION

PATENT NO. : 7,502,958 B2
APPLICATION NO. : 10/973076
DATED : March 10, 2009
INVENTOR(S) : Scott L. Michaelis et al.

It is certified that error appears in the above-identified patent and that said Letters Patent is hereby corrected as shown below:

In column 7, line 2, delete "531" and insert -- 5-31 --, therefor.

Signed and Sealed this

Eighteenth Day of August, 2009

David J. Kappos
*Director of the United States Patent and Trademark Office*